Figure 1:
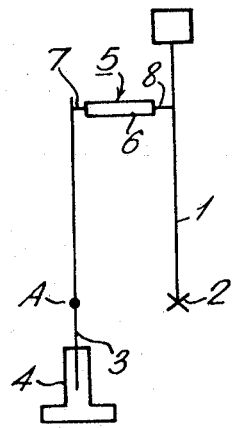

Jan. 10, 1967   A. D. BEACH   3,297,982

HORIZONTAL SEISMOMETER

Filed April 29, 1964

United States Patent Office 3,297,982
Patented Jan. 10, 1967

3,297,982
HORIZONTAL SEISMOMETER
Allan David Beach, Tadley, Basingstoke, England, assignor to United Kingdom Atomic Energy Authority, London, England
Filed Apr. 29, 1964, Ser. No. 363,386
Claims priority, application Great Britain, May 7, 1963, 17,953/63
6 Claims. (Cl. 340—17)

This invention relates to inverted pendulum seismometers for detecting or measuring horizontal movements of the earth. Seismometers for this purpose will hereinafter be termed horizontal seismometers.

The inverted pendulum of known inverted pendulum seismometers has up to now been mounted on a leaf spring, one end of which is rigidly attached to the pendulum and the other end of which is fixed to a rigid base. Movement of the pendulum flexes the spring and generates a force which restores the pendulum to its equilibrium position.

The known seismometers have been widely used for the measurement and detection of short-period horizontal movements of the earth but have not proved to be suitable for the measurement of long-period horizontal movements of the earth. A long period swing of the pendulum necessitates a relatively heavy mass, a relatively long pendulum and a relatively weak spring. It is clear that the spring is, as a consequence, subjected to excessive stress cycles which have the undesirable effect of changing the mechanical properties of the spring and hence the characteristics of the seismometer.

Flexing of the spring also has the undesirable effect of altering the effective length of the pendulum since the effective axis of rotation of the pendulum moves during the flexing movement.

Such seismometers have also required to be very carefully adjusted in any location before reliable readings could be obtained.

An object of the invention is to provide an inverted pendulum horizontal seismometer which does not suffer from the above disadvantages.

Another object of the invention is to provide an inverted pendulum seismometer which is portable and does not require elaborate adjustment and setting up in each location.

The invention is primarily useful in providing inverted pendulum long period horizontal seismometers having periods in the range of 2 to 30 seconds.

The invention consists in a seismometer comprising an inverted pendulum mounted on a frictionless hinge means, a leaf spring linked by frictionless link means to the inverted pendulum to apply a restoring force for returning the pendulum from a displaced position to its rest position, the spring being long so that excessive stress is not set up in the spring when the pendulum swings.

The frictionless link may be based on a suspension devised by Wilmore and discussed in Geophysics Supplement 6, 129 (1950). This suspension consists of a short light rod from the ends of which protrude a short length of wire. The wire is just large enough in diameter to withstand buckling and consequently it introduces only a small restoring force when flexed.

A subsidiary leaf spring can be used in combination with the first mentioned leaf to provide increased restoring force. By coupling the two together by a movable coupling, and adjusting the position of the coupling, one can cause the subsidiary spring to provide an adjustable restoring force for short period work.

The length of the leaf spring or springs should be such that there is no great distortion which would produce hysteresis or creep due to excessive stress cycles. The effective axis of rotation of the spring will move during the swing of the pendulum but this does not matter because the hinge of the pendulum is fixed. It is preferred that the effective axis of the rotation of the spring should be in the same horizontal plane as the hinge means when the pendulum is in its rest position.

The natural period of vibration of the leaf spring is above the frequency of most noise in the earth and so resonance vibrations will not be set up which would blanket the desired seismometer signals.

The spring is preferably shaped as a triangular plate and the base of the triangle is rigidly fixed to a suitable rigid base. The sides of the triangle may deviate from straight as desired in order to compensate for variations in the spring deflection rates at different points of the spring.

The period of oscillation of the seismometer of the invention is not excessively sensitive to earth tilt and can be used on any substantially horizontal surface without requiring extremely accurate leveling adjustment.

Figure 2:
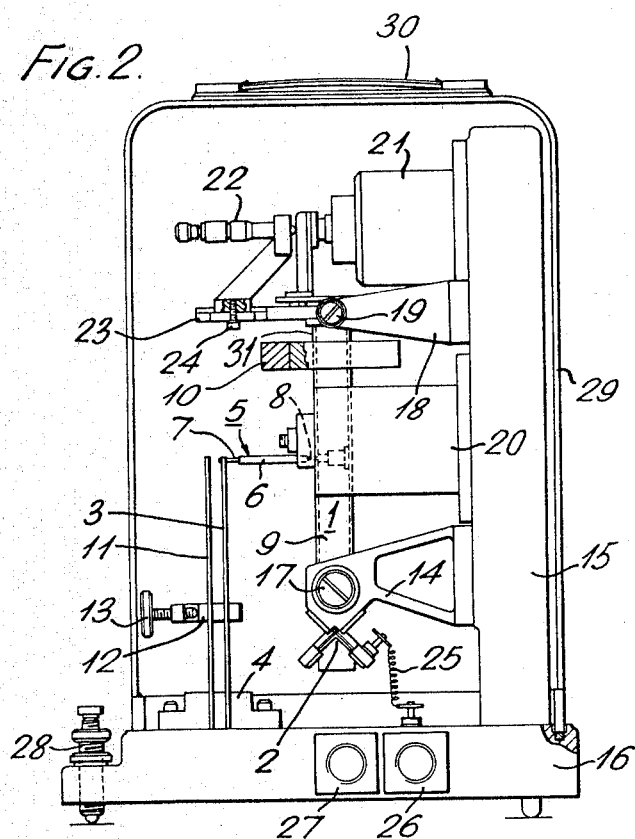

The invention will be better understood by reference to the accompanying drawing in which FIGURE 1 is a diagrammatic representation of a seismometer according to the invention and FIGURE 2 is a side view of an embodiment of the invention.

In the drawing an inverted pendulum 1 mounted on a frictionless hinge 2 has a length L. A leaf spring 3 fixed in a clamp 4 is coupled to pendulum 1 by a spoke assembly 5 constituting a frictionless link, consisting of a light rod 6 from which protrude two short lengths 7 and 8 of wire. The spring 3 has an effective axis of rotation located at point A.

The period of the pendulum is given by the expression $$T = 2\pi \sqrt{\frac{ML}{C_0 L - Mg}}$$

where T is the period in seconds
M is the mass of the pendulum
L is the length of the pendulum
$C_0$ is the spring constant and
g is the acceleration due to gravity.

A period of approximately 30 seconds can be obtained by a pendulum of mass 1.5 kg. and length 20 cms. when the total spring constant is 7.5 gm. wt./cm.

In FIGURE 2 a pendulum 1 consisting of a boom 9 and inertial mass 10, vertically adjustable on threaded portion 31, is mounted on a cross spring hinge 2 constituting a frictionless hinge means. A spoke assembly 5 connects the boom to a leaf spring 3 fixed in a clamp 4. A subsidiary leaf spring 11 is fixed in clamp 4 and is clamped parallel to spring 3 by a rigid clamp 12 having a release screw 13 to allow the clamp to be moved to any desired position on the leaves. Spoke assembly 5 consists of a light rod 6, a short wire 7 which is fitted into a corresponding hole in spring 3, and a short wire 8 fixed to the boom 9.

Cross springs 2 are mounted on a rigid frame 14 held firmly on a rigid pillar 15 mounted on a rigid base 16.

A screw 17 is turnable to lock the lower end of the boom in position during transportation of the seismometer. A frame 18 fixed to pillar 15 carries a screw 19 turnable to lock the upper end of the boom in position for transportation.

Twin electromagnetic damping units 20 (one being visible) are fixed to pillar 15. An electromagnetic displacement transducer 21 is mounted at the top of pillar 15. It is provided with a calibration head 22 mounted on a platform 23 extension of frame 18 and is held in place by a screw 24.

Electrical connections are made from the coils of electromagnetic transducer 21 and the damping units 20 to plugs 26 and 27 via a plurality of thin filaments 25. A differential leveling screw 28 is provided in base 16 for centering the pendulum. A cover 29 is provided, and has a carrying handle 30. The instrument can be readily carried to any desired place. To operate the instrument, screws 17 and 19 are turned to unlock the boom and allow it to swing. The pendulum is then centered by adjusting levelling screw 28.

Adjustment of the period is achieved for shorter periods by locking the boom and changing the position of clamp 12, raising the clamp having the effect of shortening the period, and, for longer periods by raising and lowering mass 10 on a threaded portion of boom 9.

I claim:

1. A seismometer comprising an inverted pendulum mounted on a flexural frictionless hinge means, said hinge means being characterized by the absence of relative surface contact movement at its connection to the said pendulum, wherein movement of the pendulum causes flexing of the said hinge means, said pendulum having an inertial mass, a leaf spring having one end rigidly clamped and the other end linked by a flexural frictionless link means to the inverted pendulum to apply a restoring force for returning the pendulum from a displacement position to its rest position, said link means being characterized by the absence of relative surface contact movement at its connection to the leaf spring and at its connection to the pendulum, wherein movement of the pendulum relative to the leaf spring causes flexing of the said link means, the said spring being of a sufficient length so that the mechanical properties of the spring are not changed by stresses produced by movement of the pendulum.

2. A seismometer as claimed in claim 1 in which the said frictionless link means is connected to the said pendulum at a point between the hinge means and the inertial mass.

3. A seismometer as claimed in claim 1 in which at least one of the said springs is of triangular plate configuration, the base of the triangle being rigidly clamped and the apex of the triangle being adjacent one end of the frictionless link means.

4. A seismometer as claimed in claim 2 in which the said frictionless link means comprises a rod from each end of which protrudes a flexible wire adapted to transmit a thrust without buckling, one wire being fixed to a leaf spring and the other being fixed directly to the inverted pendulum at a point spaced from the hinge.

5. A seismometer as claimed in claim 1 in which a subsidiary leaf spring is coupled to and spaced from said first mentioned leaf spring by a rigid coupling having a spacer portion located between the leaves, said coupling being adapted to be moved along said springs and to be fixed at any desired location thereon.

6. A seismometer comprising an inverted pendulum swingable about and mounted on a flexural frictionless hinge means, said hinge means being characterized by the absence of relative surface contact movement at its connection to the said pendulum, wherein movement of the pendulum causes flexing of the said hinge means, a leaf spring having a first end rigidly clamped and mounted in a plane generally parallel to the plane of the said pendulum when the leaf spring and the pendulum are at rest, and a flexural frictionless link means connecting the pendulum and the unclamped end of the leaf spring, said link means being characterized by the absence of relative surface contact movement at its connection to the leaf spring and at its connection to the pendulum, wherein movement of the pendulum relative to the leaf spring causes flexing of the said link means, wherein the swinging of the pendulum about the substantially frictionless hinge is opposed by the restoring force of the leaf spring acting through the said substantially frictionless link means.

References Cited by the Examiner
UNITED STATES PATENTS

| | | | |
|---|---|---|---|
| 2,772,086 | 11/1956 | Foster | 267—1 |
| 2,901,284 | 8/1959 | Page | 267—1 |
| 2,909,759 | 10/1959 | Cook | 340—17 |
| 2,917,918 | 12/1959 | Jenkins | 73—71.1 |
| 3,222,636 | 12/1965 | Melton | 340—17 |

BENJAMIN A. BORCHELT, *Primary Examiner.*

SAMUEL FEINBERG, *Examiner.*

P. A. SHANLEY, *Assistant Examiner.*